(12) United States Patent
Nguyen et al.

(10) Patent No.: US 9,740,854 B2
(45) Date of Patent: Aug. 22, 2017

(54) SYSTEM AND METHOD FOR CODE PROTECTION

(71) Applicant: Red Hat, Inc., Raleigh, NC (US)

(72) Inventors: Filip Nguyen, Brno (CZ); Marek Baluch, Brno (CZ)

(73) Assignee: RED HAT, INC., Raliegh, NC (US)

( * ) Notice: Subject to any disclaimer, the term of this patent is extended or adjusted under 35 U.S.C. 154(b) by 0 days.

(21) Appl. No.: 14/063,932

(22) Filed: Oct. 25, 2013

(65) Prior Publication Data

US 2015/0121553 A1    Apr. 30, 2015

(51) Int. Cl.
*G06F 21/54*    (2013.01)

(52) U.S. Cl.
CPC ................... *G06F 21/54* (2013.01)

(58) Field of Classification Search
CPC ................... G06F 8/00; G06F 8/70
See application file for complete search history.

(56) References Cited

U.S. PATENT DOCUMENTS

| | | | |
|---|---|---|---|
| 5,699,518 A * | 12/1997 | Held et al. ................ | 709/229 |
| 6,523,119 B2 * | 2/2003 | Pavlin ................ | G06F 21/123 |
| | | | 705/55 |
| 7,263,689 B1 * | 8/2007 | Edwards et al. ............. | 717/127 |
| 7,328,303 B1 * | 2/2008 | Waterhouse et al. ......... | 711/112 |
| 7,437,712 B1 * | 10/2008 | Brown et al. ................ | 717/122 |
| 7,665,086 B2 | 2/2010 | Cope et al. | |
| 7,747,877 B2 | 6/2010 | Jin et al. | |
| 7,886,162 B2 | 2/2011 | Murase et al. | |
| 8,422,674 B2 | 4/2013 | Murase et al. | |
| 2002/0087883 A1 * | 7/2002 | Wohlgemuth et al. ....... | 713/201 |
| 2004/0098613 A1 * | 5/2004 | Schiavoni ............. | G06F 21/123 |
| | | | 726/22 |
| 2007/0074050 A1 | 3/2007 | Camiel | |
| 2007/0094650 A1 * | 4/2007 | Klein et al. ................... | 717/151 |
| 2009/0249373 A1 * | 10/2009 | Lu et al. ....................... | 719/331 |
| 2011/0138295 A1 * | 6/2011 | Momchilov .......... | G06F 9/4445 |
| | | | 715/740 |

(Continued)

FOREIGN PATENT DOCUMENTS

WO    WO9607967    *    3/1996    ............... G06F 8/60

OTHER PUBLICATIONS

Using Closed-Source Dependencies with Maven, retrieved Oct. 25, 2013, 4 pages, http://stackoverflow.com/questions/4959007/using-closed-source-dependencies-with-maven.

(Continued)

*Primary Examiner* — Harunur Rashid
(74) *Attorney, Agent, or Firm* — Haynes and Boone, LLP

(57) ABSTRACT

Systems, methods, and techniques are disclosed for. An example method of providing code protection includes identifying a set of methods including one or more code portions to extract from an application. The method also includes extracting the one or more code portions from the set of methods. The one or more extracted code portions is executable on a computing device remote from a client. The method further includes inserting an interface into the application. The interface enables the client to remotely execute the one or more extracted code portions. The method also includes transmitting the application including the interface and without the one or more extracted code portions to the client.

20 Claims, 3 Drawing Sheets

(56) References Cited

U.S. PATENT DOCUMENTS

2011/0173701 A1\* 7/2011 Raley .................. G06F 21/10
                                                    726/26
2011/0321043 A1\* 12/2011 Dawson et al. .............. 718/1
2012/0131309 A1\* 5/2012 Johnson et al. ............. 712/41
2012/0167061 A1\* 6/2012 Kirovski et al. ........... 717/132
2012/0192209 A1\* 7/2012 Ray et al. .................. 719/330
2012/0246487 A1\* 9/2012 Gu et al. .................... 713/190

OTHER PUBLICATIONS

IT Information Technology Department; Service Index; retrieved Oct. 25, 2013, 2 pages, CERN Accelerating Science; http://information-technology.web.cern.ch/services/index-by-title.
Licensing ActiveX Controls, retrieved Oct. 25, 2013, 13 pages, MSDN, http://msdn.microsoft.com/en-us/library/aa751973(v=vs.85).aspx.

\* cited by examiner

SYSTEM AND METHOD FOR CODE PROTECTION

BACKGROUND

The present disclosure generally relates to computing devices, and more particularly to the protection of software code.

A customer may subscribe to a product offered by a company and pay a fee for the subscription. In an example, the company may provide a software product that is available to and downloaded by the customer. The subscription entitles the customer to use the software product as long as the subscription is active. After the subscription runs out, however, it may be difficult for the company to enforce the subscription. For example, the customer may have already downloaded the software product and have the binary files on the customer's server. As such, the customer may continue to use the software product, even after the subscription expires. Additionally, the customer may provide the downloaded software product to other non-subscribed users or the non-subscribing user may use the subscription of the subscribed customer. For example, the subscribed customer may have a username and password to access the software product and share the username and password with others. Additionally, in violation of the subscription's terms and conditions, the customer may install the downloaded software product on more servers than to which the customer is entitled. Thus, it may be difficult for the company to restrict a user's use of the software product.

BRIEF SUMMARY

This disclosure relates to the protection of software code. Methods, systems, and techniques for the protection of software code are provided.

According to an embodiment, a method of providing code protection includes identifying a set of methods including one or more code portions to extract from an application. The method also includes extracting the one or more code portions from the set of methods. The one or more extracted code portions is executable on a computing device remote from the client. The method further includes inserting an interface into the application. The interface enables the client to remotely execute the one or more extracted code portions. The method also includes transmitting the application including the interface and without the one or more extracted code portions to the client.

According to another embodiment, a system for providing code protection includes a protector that identifies a set of methods including one or more code portions to extract from an application. The protector extracts the one or more code portions from the set of methods and inserts an interface into the application. The one or more extracted code portions is executable on a computing device remote from the client. The interface enables the client to remotely execute the one or more extracted code portions. The system also includes a communications module that transmits the application including the interface and without the one or more extracted code portions to the client.

According to another embodiment, a non-transitory machine-readable medium includes a plurality of machine-readable instructions that when executed by one or more processors are adapted to cause the one or more processors to perform a method including: identifying a set of methods including one or more code portions to extract from an application; extracting the one or more code portions from the set of methods, the one or more extracted code portions being executable on a computing device remote from the client; inserting an interface into the application, the interface enabling the client to remotely execute the one or more extracted code portions; and transmitting the application including the interface and without the one or more extracted code portions to the client.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
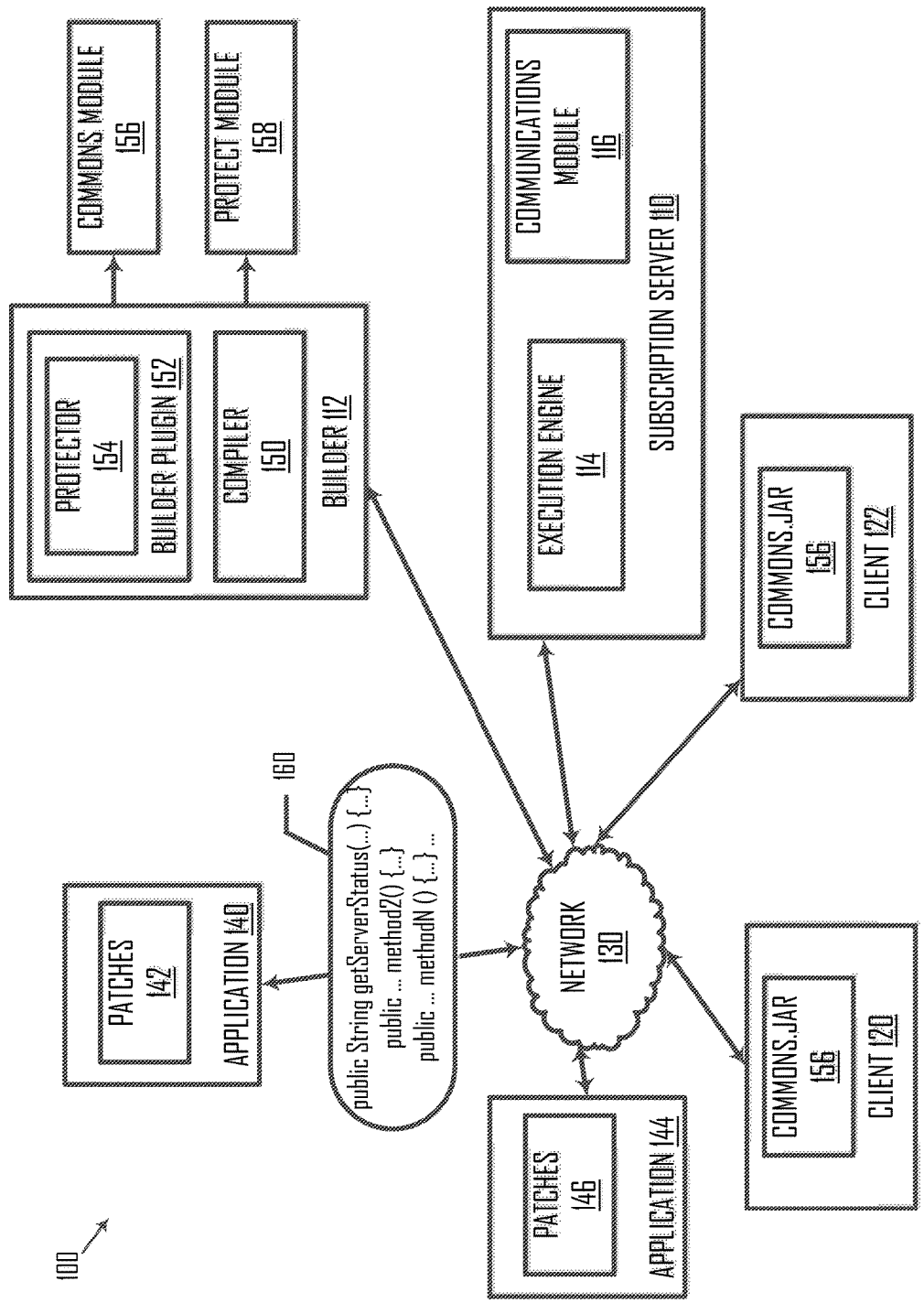
FIG. 1 is a block diagram illustrating a system for providing code protection, according to an embodiment.

Embodiments of the present disclosure and their advantages are best understood by referring to the detailed description that follows.

DETAILED DESCRIPTION

I. Overview
II. Example System Architecture
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides methods, systems, and techniques for providing a secure application. A secure application may refer to an application that has code protection. For example, a client may access a secure application that has code portions protected and not downloadable by the client. The code portions may be extracted from the secure application, and the client may download the application without these code portions, which are stored at a device remote from the client to prevent the client from having access to all of the code in the application. The extracted code stored at the remote device is executory after the extraction. As such, when the client executes the secure application, the client makes calls to the remote device to execute the extracted code portions of the application. Thus, the code portions extracted from the secure application are protected from the client.

In an example, a company may provide a software product that is downloadable to subscribed clients (e.g., users of the application). Rather than allow the subscribed clients to download all of the code in the application, the company may desire to modify the application such that the client does not have access to all of the code in the application. In an example, code portions may be extracted from the application before they are accessible to the client, and the application without the extracted code portions may be provided to the client (e.g., for downloading). When the client locally executes the application, the client may make a remote call to the subscription server to execute the extracted code portions at the subscription server. In response to the client's call, the subscription server may execute the appropriate code portions and send an output of the extracted code portions to the client. The client may receive the output and resume execution of the application. As such, the software provider is able to safeguard the extracted code portions from the client's view while still providing the client access to the functionality of the application. In this way, access to the application may be provided in accordance with a valid subscription or denied in accordance with an expired or invalid subscription. For example, the application may be usable only by clients having a valid subscription or license. In another example, the application may be provided only to subscribed clients and it is not possible for non-subscribed users to share the subscription or license. The terms subscription and license may be used interchangeably in the disclosure and are not intended to be limiting. Further, a subscription may be paid or free. For example, a customer may register with and provide personal and/or business information to the software provider for a free subscription to the application.

Although the disclosure describes the subscription server as enforcing subscriptions to software products (e.g., an application), this is not intended to be limiting. The disclosure may be applied to any situations that may benefit from the teachings in the disclosure. For example, the disclosure may be applied to any situation in which a software provider desires to limit the actual software code (compared to the functionality of the software code) provided to the client.

II. Example System Architecture

FIG. 1 is a block diagram 100 illustrating a system for providing code protection, according to an embodiment. Diagram 100 includes a subscription server 110, builder 112, and clients 120 and 122 coupled over a network 130. Applications 140 and 144 may be accessible to subscription server 110 over network 130. Network 130 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Subscription server 110 may enforce subscriptions to software products. Builder 112 "builds" an application. Builder 112 includes a builder plugin 152 and a compiler 150. In an example, builder 112 is a software application that supports plugins, and builder plugin 152 is a plug-in that provides one or more additional functionalities or features to builder 112. In an embodiment, application 140 is a JAVA® application, builder 112 is APACHE MAVEN®, which is a software product that provides a rich set of project development management and comprehension features, and builder plugin 152 is an APACHE MAVEN® plugin. Although builder plugin 152 is described as being a plugin, it should also be understood that other embodiments in which the functionalities of builder plugin 152 are native to builder 112 are also within the scope of the disclosure.

Builder plugin 152 may receive application 140 as input. In an example, builder plugin 152 receives all of the source code of application 140 as input. Builder plugin 152 includes a protector 154 that may parse application 140 and modify the application such that the client does not have access to all the software code in the application. In an embodiment, protector 154 identifies a set of methods including one or more code portions to extract from application 140. Application 140 may include classes designated as being marked as having one or more methods from which to extract code portions. Protector 154 may receive data 160 as input. In FIG. 1, data 160 includes methods "getServerStatus( )," "method2( )," and "methodN( )," and each of these methods may be identified by protector 154 as including extractable code portions. In an example, data 160 may be included in a property file that includes one or more tuples <class, method> that identifies the set of methods from which to extract code portions.

In FIG. 1, application 140 includes a patch 142, which may fix issues related to application 140. In an example, the set of methods from which to extract code portions is part of patch 142. In such an example, a software provider that provides patch 142 to application 140 may "hide" code from a subscribed client by extracting code portions from patch 142 while still providing the patch's functionality to the client. In such an example, protector 154 may obtain patch 142 as an input. This may be particularly beneficial if application 140 includes open source software and the software provider provides patch 142 to subscribed customers. In such an example, application 140 may be publicly available, but those using the application without the patch may experience problems. As such, clients may be enticed to subscribe to the application with access to patch 142.

In another example, application 140 is a first version of a product, and application 144 is a subsequent version of the product. Each version of the product may include the same set of methods that are identified as including one or more code portions for extraction. With each new released patch, however, the methods that are identified may vary. As such, application 144 includes a patch 146, which is typically different from patch 142. By the time the second version of the product is released, application 140 (including patch 142) may be open source software, and the software provider may be interested in protecting code portions in patch 146. In an example, protector 154 may obtain patch 146 as an input. In such an example, the set of methods that protector 154 identifies as including one or more code portions to extract from application 144 is different from the set of methods that protector 154 identified as including one or more code portions to extract from application 140.

In another example, applications 140 and 144 may be "versioned" and have their code compared using a source code management (SCM) repository tool (not shown). SCM is a repository that stores source code that is used during software development. Using the SCM tool, application 140 may be submitted to the SCM tool to have the source code of application 140 versioned and compared for changes against source code of application 144 at a specific time. As such, the SCM tool may determine the classes and methods that include one or more extractable code portions. The SCM tool may compare application 140 to application 144 and identify one or more changed methods. In an example, the SCM tool compares patch 142 to patch 146 and identifies new and/or modified methods in patch 146 in accordance with the comparison. The new and/or modified methods in patch 146 may be identified as including one or more code portions from which to extract. Each patch may be inspected and every changed method may be included in the standard method input set to protector 154. In this way, most of the source code that is included in the patches may be unknown to the client.

Protector 154 may determine whether to extract code portions of the identified methods in accordance with various factors. In an example, when the code portion is executable remote from the client, protector 154 determines that the code portion is extractable and may extract that code portion. In such an example, the extractable code portions are executable on a computing device remote from the client. In another example, when the code portion is stateless, protector 154 determines that the code portion is extractable and may extract that code portion. In these examples, the extracted code portion may be a conditional statement.

In another example, when the parsed code includes a local call, protector 154 determines that the code portion is not extractable. In such an example, the local call may only be executable at the client and is not executable remote from the client. As such, protector 154 does not extract that code portion that is determined to be not extractable. A call local to the client may refer to a call to a method local to the client (not remote) or to any method that is environment specific. An example of an environment specific method is a JAVA DEVELOPMENT KIT® method that is dependent on the target machine (e.g., date or currentTimeMilis). In another example, a database call may be considered a local call because the database is present and accessible only to the client.

Table A provides an example method that includes extractable code portions.

TABLE A

```
public ServerStatus getServerStatus(String clusterNodeName) {
    if (clusterNodeName == null)              // line 2
    throw new RuntimeException("Cluster node name cannot be null")
    if (nodeOffline(clusterNodeName))
    return ServerStatus.OFFLINE;
    int time = System.currentTimeMilis( );    // line 6
    while (System.currentTimeMilis( ).time->getTimeout( )) {
    if (nodeAlive(clusterNodeName))
    return ServerStatus.ONLINE;
    Thread.sleep(500)
    }
    return ServerStatus.OFFLINE;
}
```

Protector 154 may identify method "getServerStatus (String clusterNodeName)" in data 160 and illustrated in Table A as a method that may include one or more extractable code portions. In an example, protector 154 may determine that the condition "clusterNodeName==null" at line 2 in Table A is an extractable code portion. The condition is capable of being executed at a computing device remote from client 120 (e.g., at subscription server 110). In another example, protector 154 may determine that the assignment "int time=System.currentTimeMilis( )" at line 6 in Table A is not an extractable code portion because "System.currentTimeMilis( )" is dependent on executing at the target machine. Thus, protector 154 does not extract this code portion. In another example, protector 154 may determine that the condition "System.currentTimeMilis( ) time→getTimeout( )" at line 7 in Table A is not an extractable code portion because "System.currentTimeMilis( ) time→getTimeout( )" is dependent on executing at the target machine.

Protector 154 extracts from the set of methods one or more code portions identified as being extractable. In an embodiment, protector 154 inserts an interface into application 140. The interface enables the client to remotely execute the one or more extracted code portions. Protector 154 may extract code portions of applications 140 and replace the extracted code portions with an interface that enables the client to remotely execute the one or more extracted code portions. In this way, protector 154 may modify one or more methods of application 140 such that code portions are missing from the method and the actual code is not available to the client. In an example, protector 154 extracts an interface, which is a standard code refactoring technique that changes the internal structure of the code but does not affect the code's external behavior. While the internals to the code structure are changed, the code functionality is preserved. In such an example, the input method "getServerStatus(String clusterNodeName)" may be extracted to an example interface in Table B.

TABLE B

```
interface getServerStatus {
    ServerStatus getServerStatus(string);
}
```

Builder 112 may build application 140 by creating modules, compiling the source code of application 140 via compiler 150, resolving dependencies of the source code, and packaging the modules into components of the application. In an embodiment, builder plugin 152 creates modules in accordance with the one or more extracted code portions and stores all or part of the application into the modules. In an example, builder plugin 152 creates a commons module 156 and a protect module 158 in accordance with the one or more extracted code portions. Builder plugin 152 may store in commons module 156 the modified application (e.g., application 140 including the interface and without the one or more extracted code portions) and may store in protect module 158 the one or more extracted code portions. Commons module 156 and protect module 158 may be stored at subscription server 110.

In an embodiment, communications module 116 transmits commons module 156 storing compiled application 140 including the interface and without the one or more extracted code portions to the client. In an example, the client downloads commons module 156 from subscription server 110. As such, subscription server 110 and one or more clients (e.g., clients 120 and 122) may each store commons module 156 and have access to modified application 140 that includes the interface but does not include the one or more extracted code portions. Accordingly, client 120 does not have access to the code portions that were extracted from application 140.

Protect module 158 may be stored at subscription server 110 and not transmitted to the client. Accordingly, the actual code in protect module 158 and stored at subscription server 110 may be unknown and unavailable to the client. The code portions in protect module 158, however, may be remotely executed by the client at subscription server 110. The code portions extracted from application 140 and stored at the remote device are executory at the subscription server 110. In an embodiment, code portions stored in commons module 156 are executed at the client, and code portions stored in protect module 158 are executed remote from the client (e.g., at subscription server 110 or another computing device). The code portions stored in protect module 158 may be run in a cloud computing environment.

In an example, application 140 is a JAVA® application, commons module 156 generates a JAVA® Archive (JAR) file (e.g., "commons.jar"), and protect module 158 generates a JAR file (e.g., "protect.jar"). A JAR file may include class files and other file types such as image and sound files. The JAR file may be compressed, using for example, the ZIP compression format. Transmitting commons module 156 to the client may include transmitting the JAR file generated by commons module 156. Additionally, the JAR file generated by protect module 158 may be stored at subscription server 110 or another computing device remote from the clients. Although two modules are described as being created by builder plugin 152, it should be understood that other embodiments in which more than two modules are created by builder plugin 152 are within the scope of the disclosure.

When the client executes the modified application included in commons module 156, the client is unable to execute the entirely of application 140 locally because the client does not have all of the code of application 140. As such, the client may send a communication to subscription server 110 to execute that missing code portion and receive an output in accordance with executing that missing code portion from subscription server 110 in order to successfully execute the application. Subscription server 110 may receive the communication from the client and execute the appropriate code portion(s). In particular, after the code portions are extracted from application 140, they are executed at subscription server 110. The communication may be a remote method invocation (RMI) call that causes one or more extracted code portions from protect module 158 to be executed. In response to the communication, execution engine 114 may execute one or more of the extracted code portions from protect module 158, and communications module 116 may send an output in accordance with executing the extracted code portion to the client.

The communications between subscription server 110 and the client are parameterized as necessary. For example, if the code portion to be executed at subscription server 110 is "if x>y" and subscription server 110 already knows the values of variables x and y, the call from the client to subscription server 110 may exclude the values of x and y and subscription server 110 may return a true or false. In another example, if the code portion to be executed at subscription server 110 is "if x>y" and subscription server 110 does not know the values of variables x and y, the call from the client to subscription server 110 may include the values of x and y as parameters and subscription server 110 may return a true or false.

In an embodiment, builder plugin 152 implements the routine in Table C to determine how to modify application 140.

TABLE C

```
INPUTS: METHODS
main
if (commons module 156 not exist)
add commons module 156
if (protect module 158 not exist)                      // line 5
add protect module 158
add dependency on commons module 156
for each x in METHODS
let M be module of x
if (M does not have dependency on commons module 156)  // line 10
add dependency on commons module 156
List<Portions> portions = extract-code- portions (x)
for each y in portions
extract interface from y and push it into commons module 156
```

TABLE C-continued

```
put implementation of the y into protect module 158    // line 15
modify x to include only interface call to y
OUTPUTS: code portions for the method
function extract-code-portions (Method x)
for each line in (lines of method x)                   // line 20
if (line is non-trivial condition)
result += extract from method the condition without local calls
if (line is an assignment)
result += extract the right side of assignment without local calls
if (line contains local variable creation)             // line 25
result +=creation of local variable
if (line contains local variable read)
result += local variable read
```

In the example illustrated in Table C, builder plugin 152 receives methods as an input and creates commons module 156 and protect module 158 if they have not yet been created. At line 7 in Table C, builder plugin 152 adds a dependency on commons module 156, which is made as a dependency for any module that contains any of the input methods. Adding the dependency on commons module 156 may include adding an interface to commons module 156 for each input method so that anyone may use that particular input method. At line 10 in Table C, for any module "M" of the input methods that contains the method "x" and that does not have a dependency on commons module 156, builder plugin 152 adds a dependency on commons module 156. In an example, "M" is an APACHE MAVEN® module, and the module is a component of application 140. At line 12 in Table C, a function "extract-code-portions(x)" may be called with the method "x" as a parameter to retrieve the one or more extractable code portions from that method.

An output of the function "extract-code-portions" includes extractable code portions of the input method. Protector 154 may parse each line of the input method. In a first condition, protector 154 may determine whether the line is a non-trivial condition. If protector 154 determines that the line is a non-trivial condition, protector 154 may extract from the input method the condition without any local calls. In a second condition, protector 154 may determine whether the line is an assignment. If protector 154 determines that the line is an assignment, protector 154 may extract from the input method the right side of the assignment without any local calls. In a third condition, protector 154 may determine whether the line contains a local variable creation. If protector 154 determines that the line contains a local variable creation, protector 154 may extract from the input method the local variable creation. In a fourth condition, protector 154 may determine whether the line contains a local variable read. If protector 154 determines that the line contains a local variable read, protector 154 may extract from the input method the local variable read. Protector 154 may append the extracted code portions together and return them to the calling function, which then assigns the extracted code portions together to "List<Portions> portions" at line 12 in Table C. For each of the extractable code portions, protector 154 extracts an interface from the code portion and pushes the interface in commons module 156 such that the interface is publicly accessible. Protector 154 may then modify the method to include only the interface call to the extracted code portion.

In an embodiment, builder plugin 152 destroys the project and the example routine in Table C is intended for one time usage. After the routine is executed, the code of the routine may be brought back in history by an SCM repository to delete any damage done by protector 154.

Builder plugin 152 may obtain a set of ports that includes one or more Internet Protocol (IP) addresses with port numbers. In an embodiment, protect module 158 is deployed to only the IP addresses specified in the set of ports and will execute only at computing devices having those IP addresses. In this way, execution of the code portions extracted from application 140 is restricted. Further, the component generated by protect module 158 (e.g., "protect-.jar") may include the main method that runs protect module 158 on ports specified in the set of ports. In an example, an administrator may deploy the component generated by protect module 158 to every IP address specified in the set of ports.

Builder plugin 152 may also obtain another set of ports that includes one or more Internet Protocol (IP) addresses with port numbers indicating a list of subscribed clients. Based on this other set of ports, builder plugin 152 may determine whether the client is on the list of subscribed clients. If builder plugin 152 determines that the client is on the list of subscribed clients, builder plugin 152 may return to the client an output of the executed one or more extracted code portions. If builder plugin 152 determines that the client is not on the list of subscribed clients, builder plugin 152 may return to the client a message indicating that the client does not have access to the information the client is requesting.

To maintain security, client 120 may connect via a virtual private network (VPN) to subscription server 110 using an identifier. The identifier may be assigned only to subscribed clients that have a valid license (e.g., for a specified period of time). Further, the client's bandwidth may be monitored to ensure that the client is not sharing the identifier with more servers than is allowed in the subscription.

As discussed above and further emphasized here, FIG. 1 is merely an example, which should not unduly limit the scope of the claims. For example, it should be understood that although one subscription server is illustrated, other embodiments including more than one subscription server are within the scope of the present disclosure.

III. Example Method

Figure 2:
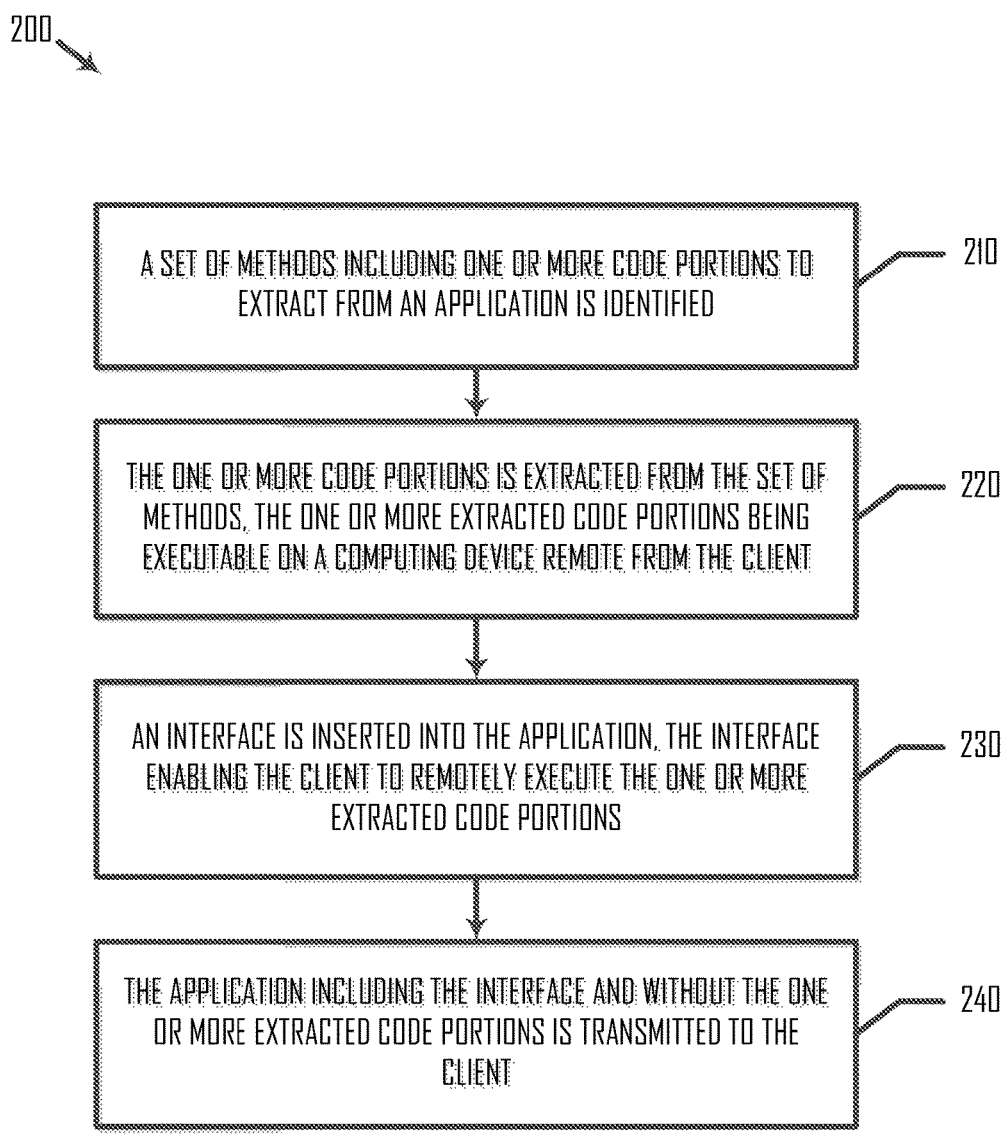
FIG. 2 is a flowchart illustrating a method of providing code protection, according to an embodiment.

FIG. 2 is a flowchart illustrating a method 200 of providing code protection, according to an embodiment. Method 200 is not meant to be limiting and may be used in other applications.

Method 200 includes blocks 210-240. In a block 210, a set of methods including one or more code portions to extract from an application is identified. In an example, protector 154 identifies a set of methods including one or more code portions to extract from application 140. In a block 220, the one or more code portions is extracted from the set of methods, the one or more extracted code portions being executable on a computing device remote from a client. In an example, protector 154 extracts the one or more code portions from the set of methods, the one or more extracted code portions being executable on a computing device remote from client 120. In a block 230, an interface is inserted into the application, the interface enabling the client to remotely execute the one or more extracted code portions. In an example, protector 154 inserts an interface into application 140, the interface enabling client 120 to remotely execute the one or more extracted code portions. In a block 240, the application including the interface and without the one or more extracted code portions is transmitted to the client. In an example, protector 154 transmits application 140 including the interface and without the one or more extracted code portions to client 120.

It is also understood that additional processes may be performed before, during, or after blocks 210-240 discussed above. It is also understood that one or more blocks of method 200 described herein may be omitted, combined, or performed in a different sequence as desired.

IV. Example Computing System

Figure 3:
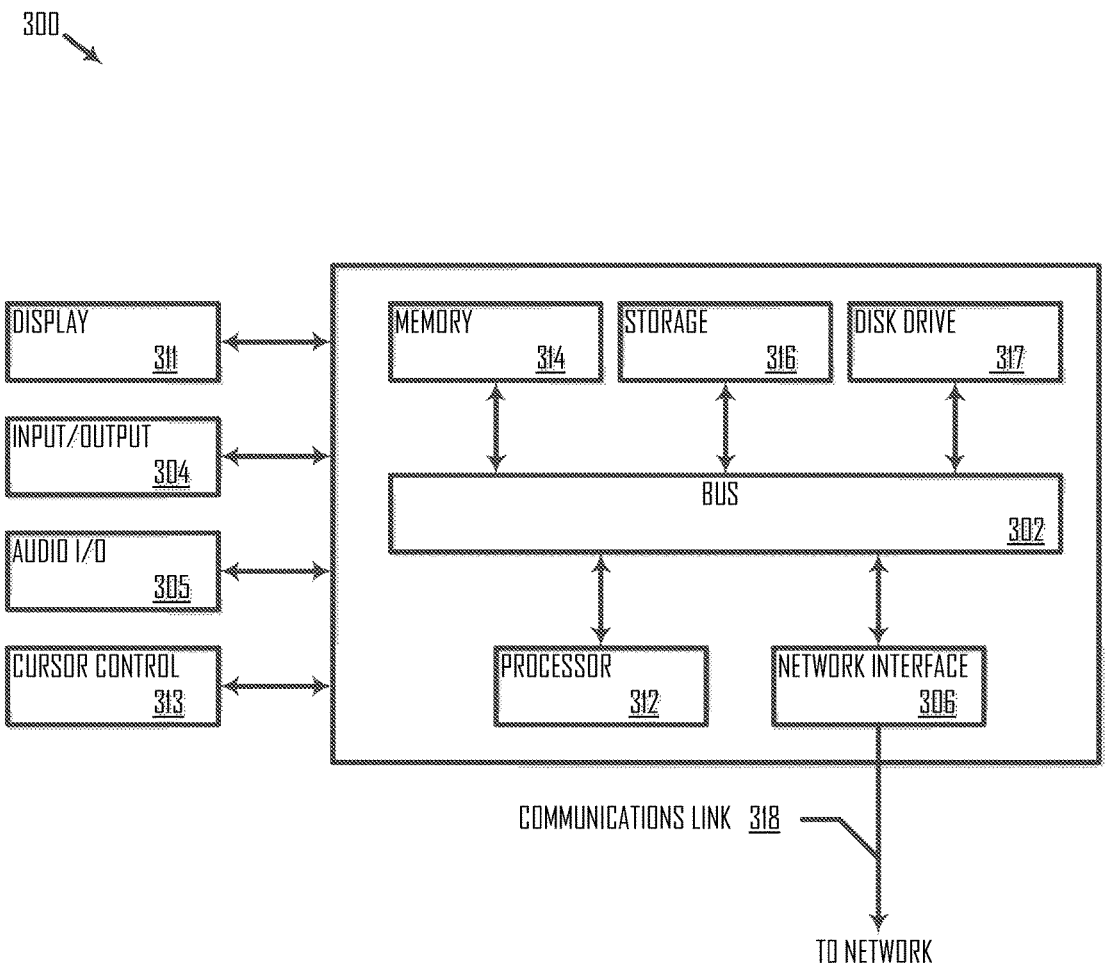
FIG. 3 is a block diagram of an electronic system suitable for implementing one or more embodiments of the present disclosure.

FIG. 3 is a block diagram of a computer system 300 suitable for implementing one or more embodiments of the present disclosure. Builder 112 may be incorporated into a computing device that includes one or more processors. The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component such as a display 311, and an input control such as a cursor control 313 (such as a keyboard, keypad, mouse, etc.). An optional audio I/O component 305 may also be included to allow a user to use voice for inputting information by converting audio signals into information signals. Audio I/O component 305 may allow the user to hear audio. A transceiver or network interface 306 transmits and receives signals between computer system 300 and other devices via a communications link 318 to a network. In an embodiment, the transmission is wireless, although other transmission mediums and methods may also be suitable. A processor 312, which may be a micro-controller, digital signal processor (DSP), or other processing component, processes these various signals, such as for display on computer system 300 or transmission to other devices via communications link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 314, and transmission media includes coaxial cables, copper wire, and fiber optics, including wires that include bus 302. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communications link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of providing code protection, the method comprising:
   identifying a set of methods including one or more code portions to extract from an application;
   determining whether the one or more code portions is executable on a computing device remote from a client;
   in response to a determination that a first code portion of the one or more code portions is executable on the computing device remote from the client, extracting the first code portion;
   in response to a determination that a second code portion of the one or more code portions is not executable on the computing device remote from the client, determining to not extract the second code portion from the set of methods;
   extracting an interface, wherein extracting the interface includes changing an internal structure of the application without affecting the application's external behavior;
   modifying the application by inserting the interface into the application, the interface enabling the client to remotely execute the first code portion;
   transmitting the modified application including the interface and the first code portion, but without the second code portion to the client;
   receiving a communication from the client;
   executing, responsive to the communication and remote from the client, the first code portion;
   creating a first module and a second module in accordance with the one or more extracted code portions;
   storing in the first module the modified application including the interface;
   storing in the second module the one or more extracted code portions; and
   obtaining a set of ports including one or more Internet Protocol (IP) addresses with port numbers, wherein the second module is deployed to the IP addresses specified in the set of ports.

2. The method of claim 1, wherein instructions stored in the first module are executed at the client, and instructions stored in the second module are executed remote from the client.

3. The method of claim 1, further including:
   sending an output of the executed one or more extracted code portions to the client.

4. The method of claim 3, wherein the communication is a remote method invocation (RMI) call.

5. The method of claim 1, further including:
   building the application, wherein the building includes creating the first module and the second module, compiling the application source code, and resolving dependencies of the source code.

6. The method of claim 1, wherein the application is a Java application, the first module is a commons module, and the second module is a protect module.

7. The method of claim 6, wherein the application is a Java application and the first and second modules are Java Archive (JAR) files.

8. The method of claim 1, wherein the first application is a first version of a product, and a second application is a subsequent version of the product, the method further including:
   identifying a second set of methods including one or more code portions to extract from the second application, wherein the first set of methods is different from the second set of methods.

9. The method of claim 1, wherein the first application includes a first software patch and the first set of methods is part of the first software patch.

10. The method of claim 9, further including:
    comparing the first application to a second application, wherein the second application is a subsequent version of the first application and includes a second software patch; and
    identifying one or more changed methods in the second software patch corresponding to one or more methods in the first application, wherein the identifying a set of methods includes identifying the one or more changed methods in the second software patch.

11. The method of claim 1, wherein the interface replaces the one or more extracted code portions.

12. The method of claim 1, wherein the one or more extracted code portions includes a conditional statement.

13. The method of claim 1, wherein the second module is deployed to only the IP addresses specified in the set of ports.

14. The method of claim 1, wherein the first module does not include the one or more extracted code portions.

15. A system for providing code protection, the system comprising:
a memory storing one or more code portions of an application;
one or more hardware processors coupled to the memory;
a protector that identifies, by the one or more hardware processors, a set of methods including the one or more code portions to extract from the application, extracts the one or more code portions from the set of methods included in the application, and modifies the application by inserting an interface into the application, wherein the one or more extracted code portions is executable on a computing device remote from a client, and wherein the interface enables the client to remotely execute the one or more extracted code portions;
a communications module that transmits, by the one or more hardware processors, the modified application including the interface and without the one or more extracted code portions to the client, and receives a communication from the client;
an execution engine that is remote from the client, wherein in response to the communication, the execution engine executes, by the one or more hardware processors, one or more extracted code portions;
a builder that creates, by the one or more hardware processors, a first module and a second module in accordance with the one or more extracted code portions and adds a dependency on the first module for a third module of the input methods that contains a particular input method, wherein the builder stores in the first module the application including the interface and stores in the second module the one or more extracted code portions; and
a builder plugin that obtains, by the one or more hardware processors, a set of ports including one or more Internet Protocol (IP) addresses with port numbers, wherein the second module is deployed only to the IP addresses specified in the set of ports.

16. The system of claim 15, wherein instructions stored in the first module are executed at the client, and instructions stored in the second module are executed remote from the client.

17. The system of claim 15, wherein the communications module sends an output of the executed one or more extracted code portions to the client.

18. The system of claim 15, wherein the protector parses the application, determines whether a parsed code portion included in a method of the application is executable remote from the client, and identifies the method as being in the set of methods in accordance with the determination.

19. The system of claim 18, wherein when the parsed code includes a local call, the protector determines that the parsed code portion is not executable remote from the client.

20. A non-transitory machine-readable medium comprising a plurality of machine-readable instructions that when executed by one or more processors is adapted to cause the one or more processors to perform a method comprising:
identifying a set of methods including one or more code portions to extract from an application;
determining whether the one or more code portions is executable on a computing device remote from a client;
in response to a determination that a first code portion of the one or more code portions is executable on the computing device remote from the client, extracting the first code portion;
in response to a determination that a second code portion of the one or more code portions is not executable on the computing device remote from the client, determining to not extract the second code portion from the set of methods;
extracting an interface, wherein extracting the interface includes changing an internal structure of the application without affecting the application's external behavior,
modifying the application by inserting the interface into the application, the interface enabling the client to remotely execute the first code portion;
transmitting the modified application including the interface and the first code portion, but without the second code portion to the client;
receiving a communication from the client;
executing, responsive to the communication and remote from the client, the first code portion;
creating a first module and a second module in accordance with the one or more extracted code portions;
storing in the first module the modified application including the interface;
storing in the second module the one or more extracted code portions; and
obtaining a set of ports including one or more Internet Protocol (IP) addresses with port numbers, wherein the second module is deployed to the IP addresses specified in the set of ports.

* * * * *